United States Patent [19]

Honatzis

[11] 4,154,383
[45] May 15, 1979

[54] HOLDER FOR LITTER BAGS

[76] Inventor: Robert W. Honatzis, 1274 Rosewood Crescent, North Vancouver, British Columbia, Canada, V7M 1T6

[21] Appl. No.: 844,132

[22] Filed: Oct. 20, 1977

[51] Int. Cl.² .................... B60N 3/08; B60R 15/00
[52] U.S. Cl. .......................... 224/42.46 R; 108/46; 206/554; 206/806; 248/95
[58] Field of Search ............. 206/554, 526, 806, 494; 108/46; 248/95, 100; 224/42.46 R, 29 R; 297/194

[56] References Cited

U.S. PATENT DOCUMENTS

| 2,678,682 | 5/1954 | Thomas | 297/194 |
|---|---|---|---|
| 2,964,173 | 12/1960 | Schnabel | 224/42.46 R |
| 3,008,569 | 11/1961 | Murch | 206/554 |
| 3,089,597 | 5/1963 | Kaplan | 224/29 R |
| 3,188,031 | 6/1965 | Fournier | 248/95 |
| 3,229,946 | 1/1966 | Mackay | 108/46 |
| 3,285,407 | 11/1966 | Abramson | 206/526 |
| 3,417,863 | 12/1968 | Paxton | 206/526 |

Primary Examiner—William T. Dixson, Jr.
Attorney, Agent, or Firm—Richards, Harris & Medlock

[57] ABSTRACT

A connector comprising an elongate resilient strip having one end connectable to an object, such as a litter bag unit, and another end attached to a retainer. The retainer is thicker than the strip near an end attached to the strip thus forming a laterally extending ridge. The retainer tapers towards another end distal the ridge. The retainer is insertable in a crevis, such as that between a side window and a door of an automobile, and the ridge prevents dislocation of the connector from the crevis.

3 Claims, 3 Drawing Figures

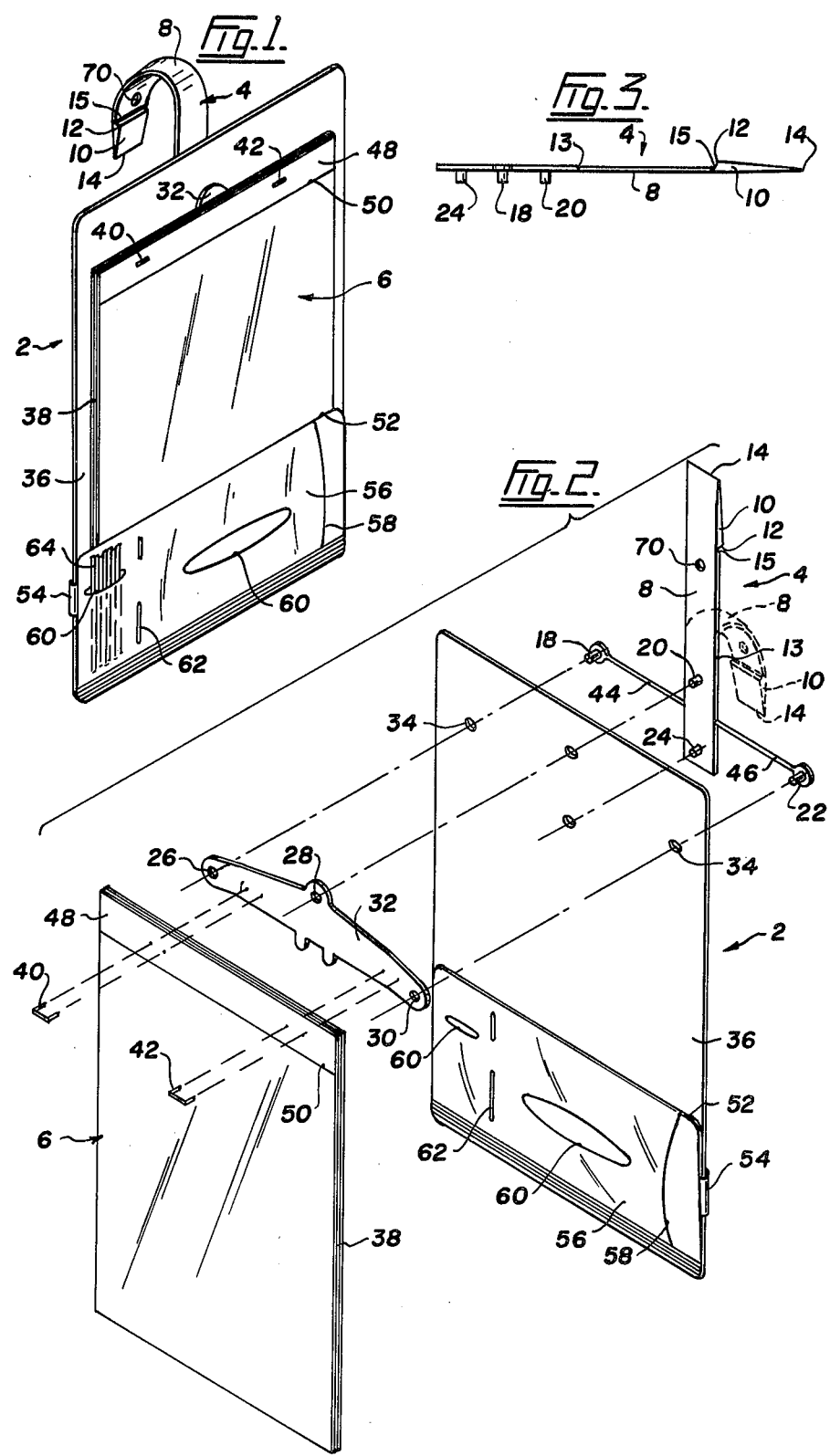

HOLDER FOR LITTER BAGS

BACKGROUND OF THE INVENTION

This invention relates to a connector for an object, such as a litter bag unit, having a retainer insertable in a crevis.

Bag holders and mounting means therefor are disclosed, for example, in U.S. Pat. Nos. 3,285,407 to Abramson, 3,646,723 to Meroney, and 3,417,863 to Paxton. U-shaped clamping or attachment means are disclosed in U.S. Pat Nos. 2,462,973 to Kerlick and 1,606,944 to Johnson. None of these patents, however, discloses a connector for a litter bag unit or the like which is readily attachable in various locations in the interior of an automobile or marine vessel such as between the window glass and interior trim, between upholstery panels and interior trim, in glove box openings, or in ashtrays.

SUMMARY OF THE INVENTION

According to this invention there is provided a connector comprising an elongate resilient strip having one end connectable to an object and having another end attached to a retainer. The retainer is thicker than the strip near an end attached to the strip thus forming a laterally extending ridge. The retainer tapers towards another end distal the ridge. The retainer is insertable in a crevis and the ridge prevents dislocation of the connector from the crevis. For example, the retainer is adapted to be inserted in a crevis between a side window and a door of an automobile. Preferably, the connector includes an aperture in the connector for placing the connector on a hook or the like.

According to another aspect of the invention, there is provided the combination of a connector as described above, and a litter bag unit including snap connecting means for attaching the connector to the litter bag unit. The connecting means comprises at least one protrusion on the connector and at least one corresponding aperture on the litter bag unit. Each aperture is for coacting with a protrusion. In drawings which illustrate embodiments of the invention:

FIG. 1 is a perspective view of a combination including a litter bag unit and a connector;

FIG. 2 is an exploded perspective view of a connector and a litter bag unit;

FIG. 3 is a side elevational view of connector.

DESCRIPTION OF THE PREFERRED EMBODIMENTS

FIG. 1 illustrates an embodiment 2 of the invention comprising the combination of a connector 4 and a litter bag unit 6. The connector 4 comprises an elongate resilient strip 8 made of a suitable plastic material such as polyethylene. One end of the resilient strip 8 is attached to retainer 10. In the present embodiment, retainer 10 is also made of a suitable plastic material, such as polyethylene, and is integral with the resilient strip 8. As shown in FIG. 3, the retainer 10 is thicker than the resilient strip 8 near the end of the retainer 10 attached to the strip thus forming a laterally extending ridge 12. The retainer tapers towards the other end 14 distal the ridge 12. A groove 13 with a V-shaped cross-section, extends transversely across strip 8 generaly mid-way between the ends of the strips 8 and similar groove 15 occurs between strip 8 and retainer 10 adjacent ridge 12. The reduced thickness of strip 8 due to grooves 13 and 15 acts as a hinge at both grooves enabling connector 4 to conform to the inverted U-shape more readily when installed, as shown in FIG. 1, and reduces any upwardly directed forces on retainer 10 from strip 8.

As shown in FIG. 2, strip 8 is attachable to litter bag unit 6 by means of snap connectors comprising protrusions 18, 20, 22, and 24, on connector 4, apertures 26, 28, and 30 on backing plate 32, and a series of apertures 34 on body 36 corresponding in position to protrusions 18, 20, 22, and 24. In the assembled form of the embodiment 2, the flat, flexible, body 36 is assembled between connector 4 and backing plate 32, the protrusions 18, 20, 22, and 24 passing through the apertures 34. Protrusions 18 and 22 are connected to resilient strip 8 by means of thin strips 44 and 46 inclusive. Each of the plurality of plastic liter bags 38 has a flap 48 extending above the bag opening 50. The plurality of bags 38 is stapled to polyethylene plate 32 by means of staples 40 and 42. The backing plate 32 is secured to litter bag unit 6 by placing the apertures 26, 28, and 30 over protrusions 18, 20, and 22 of connector 4 which extend through apertures 34 in body 36. The apertures 26, 28, and 30 are held on protrusions 18, 20, and 22 by a snapping action.

The body 36 is rectangular in shape and made of a flexible plastic material such a vinyl. The body 36 is folded near the end opposite end connector 4, forming a pocket 52. The pocket 52 is held in position by a vinyl strip 54 behind the body 36 and attached to each end of the pocket 52. A translucent vinyl sheet 56 is attached to pocket 52 along three sides by heat sealing. The fourth side 58 of the translucent sheet 56 is open to permit a small package of facial tissues (not shown) to be placed between the sheet 56 and the pocket 52. An elongate aperture 60 is provided in the sheet 56 for removing tissues. A second elongate aperture 60, and heat sealing along lines 62, provide a compartment between sheet 56 and pocket 52 for bag ties 64. As seen in FIG. 1, the bottoms of the litter bags 38 are stored in the pocket 52. When it is desired to use the litter bag unit, the front bag 56 is pulled out of pocket 52 and extends downwardly in front of pocket 52. When it is desired to dispose of the bag and its contents, the bag is pulled near the opening 50 tearing the flap 48 away from the staples 40 and 42.

The connector 4 provides convenient means for attaching the bag unit 6 to interior parts of a car or marine vessel, for example, between window glass and interior trim, between an upholstery panel and the interior trim, in glove box openings, or in ashtrays. The retainer 10 is simply inserted into an appropriate crevis with an opening narrower than the retainer at ridge 12. Since the retainer is tappered at end 14, retainer 10 may be pushed into a crevis having an opening narrower than retainer 10 at ridge 12. When the retainer has been pushed into the crevis completely, ridge 12 prevents dislocation of the connector 4 from the crevis. When such means as ashtrays and glove boxes are used to hold the liter bag unit 6, the glove box or ashtray is first opened and retainer 10 placed therein. The glove box or ash tray is then closed with resilient strip 8 passing through the crevis between the glove box or ashtray and the dashboard, for example. Ridge 12 prevents dislocation of the connector 4 from the crevis. The connector 4 also includes an aperture 70 near the retainer 10. The aperture 70 provides means for attaching the connector 4 to a hook in the interior of a car or a boat thus adding flexibility to embodiment.

When all the plastic litter bags supplied with embodiment 2 have been used, a plurality of plastic bags may be available already attached to a new backing plate 32. The old backing plate 32 is simply pulled off protrusions 18, 20, 22 and 24 and the new backing plate, containing the new bags, is positioned in its place.

While the embodiment illustrated in FIGS. 1 and 2 comprises the combination of a litter bag unit and the connector 4, the connector 4 is suitable for connecting other objects, such as storage pockets or mirrors, in locations such as the interiors of cars, trucks, or boats.

In an alternative embodiment, staples 40 and 42, for securing the plurality of bags 38 to polyethylene plate 32, are omitted and ultrasonic welds are used to fasten bags 38 to plate 32.

What I claim is:

1. A litter bag unit comprising:

a connector with an elongate resilient strip in the shape of an inverted U when in use, the strip having first snap connecting means near a first end and a retainer near a second end, the retainer being thicker than the strip near an end attached to the strip forming a laterally extending ridge, the retainer tapering towards another end distal the ridge, the retainer being insertable in a crevis and the ridge preventing dislocation of the connector from the crevis;

a flat, flexible body having a pocket near a first end and an aperture near a second end adjacent the first snap connecting means;

a backing plate having a second snap connecting means for coacting with the first snap connecting means through the aperture of the body, the first and second snap connecting means comprising a protrusion and a corresponding aperture; and a plurality of litter bags, each bag being connected to the backing plate near an open end and insertable in the pocket at a closed end.

2. A combination as claimed in claim 1, including storage places for tissues and bag ties on the pocket.

3. A connector as claimed in claim 1, the retainer being integral with the strip.

* * * * *